(12) United States Patent
Eckert et al.

(10) Patent No.: US 10,889,274 B2
(45) Date of Patent: Jan. 12, 2021

(54) METHOD AND DEVICE FOR ELECTRONIC CONTROL OF A VEHICLE DECELERATION OF A BRAKE SLIP-CONTROLLED VEHICLE

(71) Applicant: WABCO GmbH, Hannover (DE)

(72) Inventors: Horst Eckert, Rehburg-Loccum (DE); Florian Schwagmeyer, Heuerssen (DE)

(73) Assignee: WABCO GMBH, Hannover (DE)

( * ) Notice: Subject to any disclaimer, the term of this patent is extended or adjusted under 35 U.S.C. 154(b) by 470 days.

(21) Appl. No.: 15/575,822

(22) PCT Filed: Jun. 17, 2016

(86) PCT No.: PCT/EP2016/001036
§ 371 (c)(1),
(2) Date: Nov. 21, 2017

(87) PCT Pub. No.: WO2017/008879
PCT Pub. Date: Jan. 19, 2017

(65) Prior Publication Data
US 2018/0126968 A1 May 10, 2018

(30) Foreign Application Priority Data
Jul. 14, 2015 (DE) .......................... 10 2015 009 160

(51) Int. Cl.
*B60T 8/17* (2006.01)
*B60T 8/32* (2006.01)

(52) U.S. Cl.
CPC ............ *B60T 8/1708* (2013.01); *B60T 8/323* (2013.01)

(58) Field of Classification Search
CPC .............................. B60T 8/1708; B60T 8/323
See application file for complete search history.

(56) References Cited

U.S. PATENT DOCUMENTS

| | | |
|---|---|---|
| 4,998,593 A | 3/1991 | Karnopp et al. |
| 5,302,010 A | 4/1994 | Ehmer et al. |
| 5,551,771 A | 9/1996 | Akuzawa et al. |
| 5,769,510 A | 6/1998 | Akuzawa et al. |
| 2003/0074122 A1 | 4/2003 | Hac |

(Continued)

FOREIGN PATENT DOCUMENTS

| | | |
|---|---|---|
| DE | 4010332 A1 | 10/1990 |
| DE | 3921309 A1 | 1/1991 |

(Continued)

*Primary Examiner* — Donald J Wallace
(74) *Attorney, Agent, or Firm* — Leydig, Voit & Mayer, Ltd.

(57) ABSTRACT

A method for electronically controlling a vehicle deceleration of a brake slip-controlled vehicle comprising a pneumatic braking system includes detecting that at least one wheel of the vehicle has a brake slip that exceeds a setpoint brake slip; in response to detecting that at least one of the wheels of the vehicle has a brake slip that exceeds the setpoint brake slip, brake slip-controlling the at least one wheel in order to prevent a lockup of the at least one wheel; determining a braking effect caused by wheel brakes on the wheels of the vehicle; and adjusting brake pressures output at the wheel brakes of one or more non-brake slip-controlled wheels in order to adjust the induced braking effect. The brake pressures at the wheel brakes of all non-brake slip-controlled wheels are adjusted.

20 Claims, 5 Drawing Sheets

(56) References Cited

U.S. PATENT DOCUMENTS

| | | | |
|---|---|---|---|
| 2006/0163940 A1 | 7/2006 | Alvarez et al. | |
| 2008/0086251 A1* | 4/2008 | Lu | B60T 8/1755 |
| | | | 701/70 |
| 2008/0125948 A1* | 5/2008 | Matsuda | B60T 8/172 |
| | | | 701/83 |

FOREIGN PATENT DOCUMENTS

| | | |
|---|---|---|
| DE | 4018495 A1 | 12/1991 |
| DE | 4419520 A1 | 12/1994 |
| DE | 102004035579 A1 | 2/2006 |
| DE | 60224971 T2 | 2/2009 |
| WO | WO 2008114039 A1 | 9/2008 |

* cited by examiner

METHOD AND DEVICE FOR ELECTRONIC CONTROL OF A VEHICLE DECELERATION OF A BRAKE SLIP-CONTROLLED VEHICLE

CROSS REFERENCE TO RELATED APPLICATIONS

This application is a U.S. National Stage Application under 35 U.S.C. § 371 of International Application No. PCT/EP2016/001036 filed on Jun. 17, 2016, and claims benefit to German Patent Application No. DE 10 2015 009 160.3 filed on Jul. 14, 2015. The International Application was published in German on Jan. 19, 2017 as WO 2017/008879 A1 under PCT Article 21(2).

FIELD

The invention relates to a method for electronically controlling a vehicle deceleration during a control intervention by an antilock braking system (ABS) on at least one wheel of the vehicle, and to a device for carrying out such a method.

BACKGROUND

In vehicles, in particular commercial vehicles, an antilock braking system (ABS) can be provided in addition to one or more further driver assistance systems such as, for example, an electronic stability program (ESP), an adaptive cruise control (ACC), a roll stability control (RSC), or an emergency braking system (AEBS), as part of an electronic braking system (EBS). If it is detected during any type of braking event that a brake slip is present at at least one of the brakeable wheels of the vehicle that is too high, i.e., a brake slip that is greater than a setpoint brake slip, the ABS prompts a brake pressure to be held or reduced at a wheel brake of this wheel in order to counteract a lockup of this wheel. As a result, the brake slip-controlled wheel makes less of a contribution to the braking of the vehicle, wherein an actual vehicle deceleration, i.e., the present negative acceleration of the vehicle, is reduced; a setpoint vehicle deceleration, which can be demanded not only by the ABS but also by at least one further driver assistance system in the vehicle, can therefore no longer be achieved (with certainty).

The roll stability control (RSC), as one of the driver assistance or stability control systems, is used, in particular, for preventing the vehicle from overturning during cornering. In such systems, the lateral acceleration, for example, i.e., the transversal acceleration of the vehicle, and the center of gravity and the wheel rotational speeds of the wheels are monitored and, in the event that a transversal acceleration limiting value, for example, is exceeded, a corresponding intervention into the control of the engine and the wheel brakes is carried out. As a result, the vehicle can be stabilized in driving-critical situations, in particular in a curve.

DE 10 2004 035 579 A1 describes, in this regard, a method for the roll stabilization of a vehicle during cornering, wherein it is provided to determine a tipping threshold of the vehicle, in particular depending on a load of the vehicle, a yaw rate, a driving speed, and rotational speeds of the inner and the outer wheels.

The two systems—ABS and RSC—can also be linked to each other in order to adjust the brake pressures at the wheel brakes of the vehicle. DE 40 10 332 C2 discloses, in this regard, a method for steering and braking control, wherein, in the event that a limiting value for the transversal acceleration or the yaw velocity is exceeded, the brake pressure for the vehicle side corresponding to the direction of the yaw or of the transversal acceleration is reduced and the brake pressure on the opposite side of the vehicle is increased, in particular. In this case, if antilock braking control is available, the setpoint brake slip of the wheels can be additionally taken into consideration or the setpoint brake slip can be adjusted accordingly at individual wheels in order to not exceed the limiting value of the transversal acceleration or the yaw velocity.

In addition, DE 40 18 495 A1 discloses a device for controlling a vehicle that is tending to oversteer. According thereto, in the event that an inner front wheel is brake slip-controlled, i.e., is tending to lock up, during cornering, limiting values for a brake slip and a deceleration for an outer front wheel are increased, and so a braking torque acting on this outer front wheel can be further increased. A tendency to oversteer can be reduced as a result.

The disadvantage in this case is that the brake slip-controlled, inner front wheel makes less of a contribution to achieving a demanded braking effect and this missing braking effect cannot be reliably provided only by means of the outer front wheel. If the vehicle is therefore not braked soon enough, the vehicle may overturn. In addition, as a result of the additional braking or the increase in the limiting values of only one wheel, there can be a loss of stability during cornering, since the increase in the braking effect is concentrated on only one wheel.

SUMMARY

In an embodiment, the present invention provides a method for electronically controlling a vehicle deceleration of a brake slip-controlled vehicle comprising a pneumatic braking system. The method includes detecting that at least one wheel of the vehicle has a brake slip that exceeds a setpoint brake slip; in response to detecting that at least one of the wheels of the vehicle has a brake slip that exceeds the setpoint brake slip, brake slip-controlling the at least one wheel in order to prevent a lockup of the at least one wheel; determining a braking effect caused by wheel brakes on the wheels of the vehicle; and adjusting brake pressures output at the wheel brakes of one or more non-brake slip-controlled wheels in order to adjust the induced braking effect. The brake pressures at the wheel brakes of all non-brake slip-controlled wheels are adjusted. The brake pressures are selected in such a way that a braking effect reduced by the brake slip control at the at least one wheel is compensated for by the adjustment of the brake pressures on the wheel brakes of all non-brake slip-controlled wheels.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide a method and a device for electronically controlling a vehicle deceleration of a brake slip-controlled vehicle that provide for a safe and reliable braking of the vehicle.

According to embodiments of the invention, it is therefore provided to monitor, in a vehicle, whether at least one of the brakeable wheels is brake slip-controlled by an antilock braking system (ABS), wherein, in this case, brake pressures at wheel brakes of all other non-brake slip-controlled wheels are adjusted in order to compensate for a braking effect reduced by the at least one brake slip-controlled wheel.

As a result, the advantage can already be achieved that a demanded setpoint vehicle deceleration, which is preferably demanded by any type of driver assistance system—except for the ABS—or stability control system in the vehicle, is also reached when at least one of the wheels is brake slip-controlled by the ABS and therefore makes less of a contribution to reaching the setpoint vehicle deceleration than is the case if demanded by the driver assistance system or the stability control system in the vehicle. The reason therefor is that the active ABS control prompts the brake pressure on the wheel tending to slip or lock up to be held or reduced in order to once again reduce the tendency of this wheel to lock up. As a result, a present actual vehicle deceleration, i.e., a negative acceleration of the vehicle in a longitudinal direction or in the direction of travel, is reduced; i.e., the actual vehicle deceleration is less than the demanded setpoint vehicle deceleration.

The braking effect that is therefore missing can be advantageously compensated for by way of the adjustment, according to embodiments of the invention, of the brake pressures on the wheel brakes of all other non-brake slip-controlled wheels of the vehicle. It is preferably provided in this case that a total brake pressure, which results from the sum of the brake pressures present at all wheel brakes of the vehicle, during active brake slip control is approximately equal to the total brake pressure without active brake slip control. This means, all that takes place is a redistribution of the brake pressures in order to reach the demanded setpoint vehicle deceleration and to therefore compensate for the missing braking effect.

According to one alternative embodiment, a total braking torque or a total braking force can be monitored instead of a total brake pressure. This means, the brake pressures at the wheel brakes of all other non-brake slip-controlled wheels of the vehicle are adjusted in such a way that the resultant total braking torque or the total braking force during active brake slip control is approximately equal to the values without active brake slip control. In addition, a braking effect reduced by means of the active ABS control can therefore be advantageously compensated for.

The demanded braking effect, which is specified by the setpoint vehicle deceleration, can therefore be characterized either by a total brake pressure, a total braking torque, or a total braking force, which results from the sum of the brake pressures, the braking torques, or the braking forces of the individual wheel brakes or wheels of the vehicle, respectively. The braking torque or the braking force can be derived, in this case, from the demanded brake pressure, in particular with consideration for a size of a brake cylinder of the corresponding wheel brake.

According to embodiments of the invention, reaching the setpoint vehicle deceleration is therefore more important than the risk of causing a lockup by way of, for example, the increase—which is carried out within the scope of the adjustment—of the brake pressures on the non-brake slip-controlled wheels or the wheels that are not tending to lock up. Due to the fact that it is not only the wheel brakes of one wheel that are controlled, but rather the wheel brakes of all non-brake slip-controlled wheels, the missing braking effect is also uniformly distributed, which contributes to the stability of the vehicle.

Advantageously, a method according to an embodiment of the invention can also be carried out during braking while cornering, wherein the inner wheels tend to slip due to dynamic, axle load-related and axle-related wheel load displacements during cornering. The reason therefor is that the weight of the vehicle is shifted onto the outer wheels during cornering; the inner wheels, by contrast, are pressed onto the road to a lesser extent. Therefore, during braking in a curve, additional monitoring is preferably carried out to determine whether one or more inner wheels is/are brake slip-controlled by the ABS, i.e., has/have a brake slip which is higher than a setpoint brake slip, i.e., the ABS becomes active at these inner wheels which are tending to lock up. In this case, the brake pressures at the wheel brakes of all other—outer and inner—non-brake slip-controlled wheels of the vehicle are adjusted by means of a method according to an embodiment of the invention.

It can therefore be ensured that the demanded braking effect can also be reached during cornering, whereby the vehicle becomes more stable overall, since it is decelerated in the curve according to the demand and therefore has less of a tendency to overturn, in particular when the demanded braking effect or the demanded setpoint vehicle deceleration is provided by a roll stability control (RSC) which evaluates the likelihood of overturning during cornering and, depending thereon, specifies a setpoint vehicle deceleration.

As a result, it is advantageously recognized that, in order to prevent the vehicle from overturning, reaching the setpoint vehicle deceleration is more important than the risk of causing a lockup by way of adjusting or increasing the brake pressures on wheels that are non-brake slip-controlled or that are not tending to lock up. This results in a safe driving behavior overall, since a case of slip on a further vehicle axle or a further wheel is less serious than an overturning vehicle.

The setpoint vehicle deceleration is specified for a method according to an embodiment of the invention in particular by one or more arbitrary electronic driver assistance systems, for example by a stability program (ESP), an adaptive cruise control (ACC), the roll stability control (RSC), or an emergency braking system (AEBS), which are part of an electronic braking system (EBS). As a supplement thereto, a braking demand specified by the driver, e.g., by pressing on the brake pedal, can be incorporated, if available, into the setpoint vehicle deceleration, wherein the setpoint vehicle deceleration can be detected for this purpose by a braking power sensor, for example, i.e., a displacement sensor which detects an actuating travel of a brake valve or an actuating travel of the brake pedal implemented by the driver, or by a pressure sensor which detects a brake pressure controlled by the driver with the aid of a brake valve.

The roll stability control, in particular, is provided in order to stabilize the vehicle during cornering. The roll stability control is controlled by an RSC control unit, wherein the RSC control unit processes a setpoint vehicle deceleration which is possibly demanded by the driver and, depending on parameters such as, e.g., a lateral acceleration, i.e., a transversal acceleration of the vehicle, a center of gravity of the vehicle, and on wheel rotational speeds of the wheels of the vehicle, evaluates whether the vehicle is tending to overturn during the cornering. If it is concluded on the basis of these parameters that the likelihood of the vehicle overturning is too high, for example, starting at a certain transversal acceleration limiting value, a setpoint vehicle deceleration is output by the RSC control unit, depending on which a controlling intervention into the brake control and into the engine control of the vehicle is carried out; i.e., a setpoint vehicle deceleration possibly demanded by the driver is increased, for example, to a value at which the likelihood of the vehicle overturning becomes less again, i.e., the vehicle is decelerated in this case by a greater extent than has been demanded by the driver. If a setpoint vehicle deceleration demanded by the driver is not present during the cornering, the RSC control unit determines, based solely on the present parameters, a setpoint vehicle deceleration at which the likelihood of overturning occurring is less.

Depending on the demanded setpoint vehicle deceleration, corresponding brake pressures which cause a certain braking force or a braking torque at the wheels are then set at the particular wheel brakes, and so an actual vehicle deceleration corresponding to the demanded setpoint vehicle deceleration results. According to an embodiment of the invention, upon detection, by the ABS, of an active brake slip control at at least one of the wheels, the brake pressures that have been set and, therefore, the corresponding braking torques or braking forces at the non-brake slip-controlled wheels are adjusted in order to be able to fulfill the setpoint vehicle deceleration again.

The adjustment of the brake pressures and, therefore, the braking torques or the braking forces, i.e., the implementation of a method according to an embodiment of the invention, is carried out and controlled in this case by a deceleration unit according to an embodiment of the invention. This is designed to specify, for example increase, a brake pressure output at the wheel brakes and, therefore, a certain braking torque or a braking force, depending on the setpoint vehicle deceleration demanded, in particular, by the particular driver assistance system and depending on the number of ABS brake slip-controlled wheels. Preferably, this specified brake pressure is correspondingly set at the wheel brakes via an ABS control unit, wherein the ABS control unit controls, for this purpose, brake valves, in particular, for providing an increased brake pressure from reservoirs and the ABS brake valves, i.e., outlet valves and inlet valves, which are preferably designed as 2/2 solenoid valves. If the brake pressure is to be increased at the particular wheel brakes, a higher brake pressure is therefore initially provided and this brake pressure is forwarded to the wheel brakes by way of a corresponding control of the ABS brake valves, for example by way of a timed control of the inlet valves while the outlet valves are closed.

The deceleration unit can either be provided in the ABS control unit, for example also as a software module, or the brake pressures to be correspondingly output can be specified to the ABS control unit from an external source, for example via a data bus. The brake system is preferably a hydraulic or pneumatic brake system, in which a fluid pressure or an air pressure is provided and output.

Advantageously, the brake pressures at the wheel brakes of the wheels that are non-brake slip-controlled by the ABS or are not tending to lock up are adjusted by a factor starting from the presently output brake pressures that have been set in order to effectuate the setpoint vehicle deceleration and that induce a certain braking force or a braking torque depending, inter alia, on the size of the brake cylinder, in order to once again reach the total brake pressure or the total braking torque or the total braking force before activation of the ABS control. Accordingly, the brake pressures or braking torques or braking forces output at these wheel brakes, i.e., a variable characterizing the braking effect induced by the wheel brakes, is initially determined by the deceleration unit, for example estimated with the aid of vehicle-related parameters stored in an EBS control unit of the electronic brake system, and are multiplied, for example, by a factor. The factor is dependent, in particular, on the number of wheels of the vehicle that are brake slip-controlled by the ABS. The reason therefor is that, in the event that more than one wheel that is brake slip-controlled by the ABS no longer fully contributes to reaching the demanded setpoint vehicle deceleration by way of the actual vehicle deceleration, the other, non-brake slip-controlled wheels must compensate therefor that much more; the factor is increased in this case. In order to determine the factor, the total brake pressure or the total braking torque or the total braking force before activation of the ABS control—which results from the setpoint vehicle deceleration, in particular with consideration for parameters such as a brake cylinder size—is utilized.

The factor can also be dynamically adjusted during the braked travel, for example depending on how the vehicle responds—via its actual vehicle deceleration with respect to the demanded setpoint vehicle deceleration—to the adjustment, according to an embodiment of the invention, of the brake pressures or braking torques or braking forces. For this purpose, the stability can be monitored by an ESP, for example, and, depending thereon, the factor can be adjusted for individual wheels.

It is therefore also possible to individually specify factors for each wheel in order to increase, e.g., during cornering, the brake pressure or the braking torques or the braking forces of the outer wheels to a greater extent than the brake pressure or the braking torques or the braking forces of the inner wheels. This can take place, for example, depending on the transversal acceleration, wherein an anticipatory evaluation can already be advantageously carried out to determine, in particular depending on the transversal acceleration or the brake slips, whether a further case of brake slip control by the ABS is imminent at one of the inner wheels, for example when a tolerance for the brake slip is exceeded. In the case, as a precaution, the factor can be selected to be lower for the wheel brakes of the non-brake slip-controlled inner wheel brakes and the factor at the outer wheel brakes can be increased in order to advantageously be able to prevent or delay the imminent further case of brake slip control by means of the ABS.

As a result, the safety of the braking procedure advantageously increases, since the inner wheels already tend to slip at lower brake pressures or braking torques or braking forces. Therefore, the setpoint vehicle deceleration can be reached nevertheless by way of the dynamic redistribution of the brake pressures or the braking torques or the braking forces, without adversely affecting the stability of the vehicle.

It is also possible to control the adjustment of the brake pressures or braking torques or braking forces by the factor during travel in the vehicle longitudinal direction, however, by establishing the tolerance for the brake slip, which is below the setpoint brake slip, in that, in the event that the tolerance is exceeded at one of the non-brake slip-controlled wheels, the factor for this wheel is selected to be lower than at the other non-brake slip-controlled wheels, the brake slip of which is below the tolerance. An imminent lockup of a non-brake slip-controlled wheel can therefore be avoided as a precaution; safety increases.

It is therefore possible to select factors that are greater than or less than one in order to reach the total brake pressure or the total braking torque or the total braking force, i.e., the output or set brake pressure or the braking torque or the braking force at the non-brake slip-controlled wheel brakes is increased or reduced. The only decisive factor is that the total brake pressure or the total braking torque or the total braking force for effectuating the specified setpoint vehicle deceleration remains approximately the same with and without ABS control in order to be able to reliably reach the setpoint vehicle deceleration.

In addition, wheel-specific factors can also be established depending on a weight or a load of the vehicle, wherein, for example in the case of a low load, i.e., a lower weight on the rear axle or the rear wheels and a high weight, i.e., a higher weight on the front axle or the front wheels, the factors on the rear axle or the non-brake slip-controlled rear wheels are selected to be lower as compared to the factors on the front axle or the non-brake slip-controlled front wheels. The reason therefor is that the wheels on the rear axle have a greater tendency to lock up in the case of a low load than do the wheels on the front axle.

Advantageously, the ABS control takes precedence over a method according to an embodiment of the invention in any driving situation, i.e., if the brake pressure at the non-brake slip-controlled wheels is increased as a result of an application of a method according to an embodiment of the invention and, as a result, the brake slip increases at one of these wheels beyond the setpoint brake slip, the ABS control initiates a holding or lowering of the brake pressure at this wheel.

Preferably, the vehicle can be a single-piece commercial vehicle, i.e., for example, a bus or a truck comprising two or more brakeable axles. The method can also be carried out in multiple-piece vehicles, for example in a truck comprising a trailer or a truck tractor, i.e., a tractor comprising a semi-trailer. In this case, the wheels of the truck or the tractor as well as the wheels of the trailer or of the semi-trailer can be brakeable. Accordingly, the brake pressures at the wheel brakes of the non-brake slip-controlled wheels of the trailer or of the semi-trailer can also be adjusted by way of a method according to an embodiment of the invention in the event of brake slip control carried out by the ABS, for example at one of the wheels of the truck or the tractor, in order to compensate for the missing braking effect. The same applies in the case of brake slip control carried out by the ABS at one of the wheels of the trailer or of the semi-trailer. In this case, it can be taken into consideration during the adjustment of the brake pressures by means of the factor that the trailer or the semi-trailer has a tendency toward unstable driving behavior, i.e., the brake pressures are increased to a lesser extent at the trailer or the semi-trailer than at the wheel brakes of the truck or the tractor.

Figure 1:
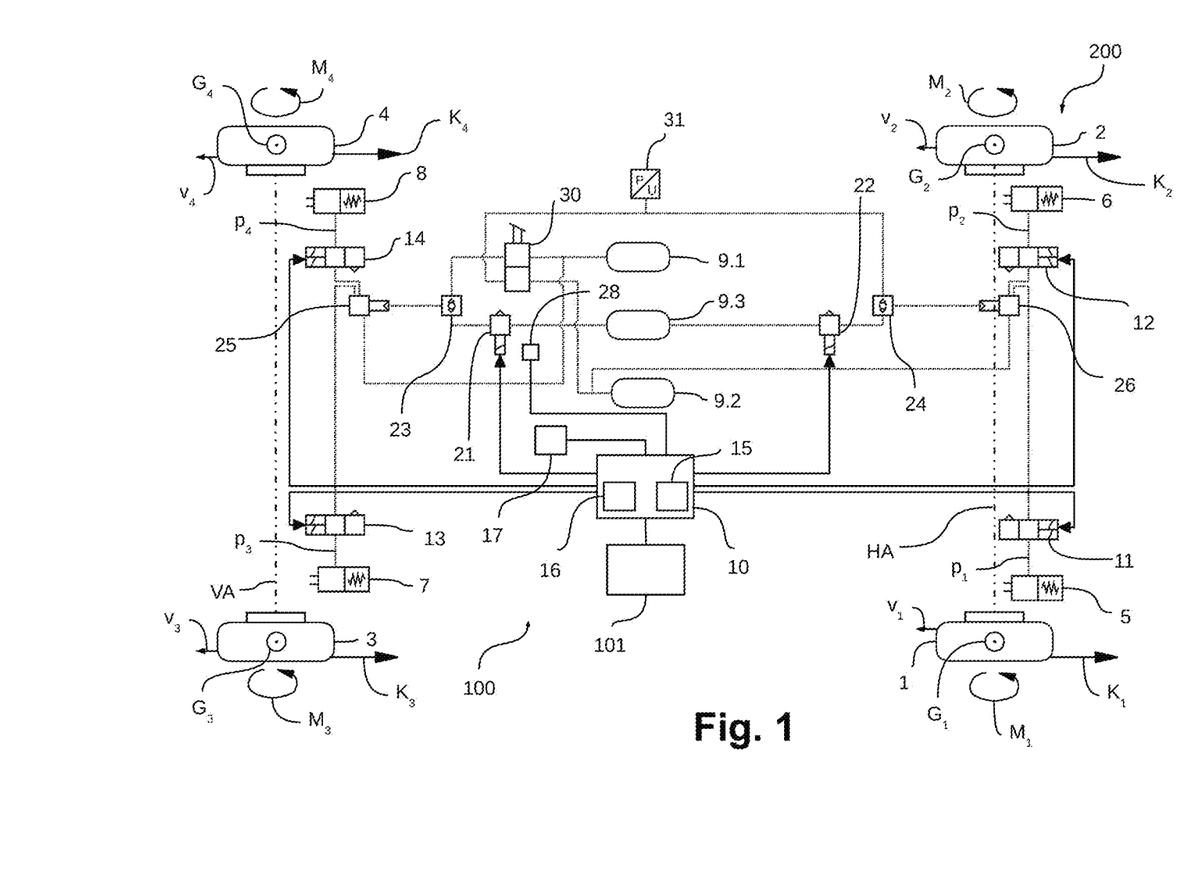
FIG. 1 shows a block diagram of a vehicle comprising an electronic brake system.

FIG. 1 shows a vehicle 200 comprising an electronic brake system 100 including the components which are relevant here. Accordingly, a rear axle HA including rear wheels 1, 2 and a front axle VA including front wheels 3, 4 are provided. The rear wheels 1, 2 can be braked using rear wheel brakes 5, 6 and the front wheels 3, 4 can be braked using front wheel brakes 7, 8. The brake system 100 can be an electro-hydraulic or electro-pneumatic brake system, i.e. a fluid pressure or an air pressure is delivered.

For the purpose of brake slip-controlled braking, the brake system 100 comprises an antilock braking system (ABS) including an ABS control unit 10 which controls, in a pulsed manner, the ABS brake valves 11, 12, 13, 14 depending on a detected brake slip $BS_1$, $BS_2$, $BS_3$, $BS_4$ at the wheel 1, 2, 3, 4, respectively.

The ABS brake valves 11, 12, 13, 14 at the rear and the front wheel brakes 5, 6, 7, 8 comprise an inlet valve and an outlet valve, each of which is designed as a 2/2 solenoid valve. If the inlet valve is open and the outlet valve is blocked, the corresponding wheel brakes 5, 6, 7, 8 can be acted upon by a brake pressure $p_1$, $p_2$, $p_3$, $p_4$ provided by pressure reservoirs 9.1, 9.2 for the corresponding brake circuit and output by a brake valve 30 and relay valves 25, 26, and therefore a corresponding braking by the wheels 1, 2, 3, 4 can be effectuated. If the inlet valve is blocked and the outlet valve is open, the rear and the front wheel brakes 5, 6, 7, 8 are bled and the braking effects by the wheels 1, 2, 3, 4 are reduced. If both the inlet valve and the outlet valve are blocked, a brake pressure $p_1$, $p_2$, $p_3$, $p_4$ acting on the rear and the front wheel brakes 5, 6, 7, 8 is held.

The brake pressures $p_1$, $p_2$, $p_3$, $p_4$ at the wheel brakes 5, 6, 7, 8, respectively, of the wheels 1, 2, 3, 4 can be set in a wheel-specific manner by the ABS control unit 10, and so it is possible to respond accordingly to a case of a setpoint brake slip $BS_{Soll}$ being exceeded at one of the wheels 1, 2, 3, 4. This means, if it is detected by the ABS control unit 10 that, for example, the brake slip $BS_3$ at the left front wheel 3 deviates in such a way as to exceed a setpoint brake slip $BS_{Soll}$, i.e., the left front wheel 3 is tending to slip or lock up, the ABS control unit 10 prompts the brake pressure $p_3$ at the wheel brake 7 to be held or reduced by way of a corresponding control of the ABS brake valve 13.

According to this embodiment, a roll stability control (RSC) controlled by a RSC control unit 16 is provided in the ABS control unit 10 as one further driver assistance system or stability control system, which roll stability control determines whether the vehicle 200 is tending to overturn or not during cornering along a path C (see FIG. 2a and FIG. 3), in particular on the basis of a present lateral acceleration $z_{quer}$, i.e., a transversal acceleration of the vehicle 200, which can be measured by a transversal acceleration sensor 17, for example, and on the basis of wheel rotational speeds $v_1$, $v_2$, $v_3$, $v_4$ of the wheels 1, 2, 3, 4, and a vehicle center of gravity FS. If there is a tendency to overturn, the RSC control unit 16 outputs a setpoint vehicle deceleration $z_{Soll}$ which additionally takes into account a setpoint vehicle deceleration $z_{Soll}$—which is detected via a braking power sensor 31 designed as a pressure sensor—in the event that the brake pedal is actuated by the driver. The setpoint vehicle deceleration $z_{Soll}$ is therefore adjusted or demanded in such a way that the vehicle 200 is decelerated to a greater extent in order to counteract a rollover.

The roll stability control is merely optional in this case and is not absolutely necessary for a method according to an embodiment of the invention. In addition or as an alternative thereto, the setpoint vehicle deceleration $z_{Soll}$ can also be specified by any other type of driver assistance system or stability control system, for example a stability program (ESP), an adaptive cruise control (ACC), or an emergency braking system (AEBS), which are part of the electronic brake system 100, and can be transmitted to the ABS control unit 10.

In order to ensure that the setpoint vehicle deceleration $z_{Soll}$—that has been demanded by the particular driver assistance system and that is optionally required in addition to a setpoint vehicle deceleration demanded by the driver— sets in, the ABS control unit 10 controls the wheel brakes 5, 6, 7, 8 with the corresponding brake pressures $p_1$, $p_2$, $p_3$, $p_4$. According to this embodiment, this can be achieved, in particular, by way of the ABS control unit 10 initially controlling a 3/2 directional control valve 21 for the wheel brakes 7, 8 of the front axle VA or a 3/2 directional control valve 22 for the wheel brakes 5, 6 of the rear axle HA, which directional control valves are connected to a further pressure reservoir 9.3. The 3/2 directional valves 21, 22 are connected via a non-return valve 23, 24, respectively, to a relay valve 25, 26, respectively, for the vehicle axle VA, HA, respectively. During a corresponding control of the 3/2 directional valves 21, 22, a pressure, which is optionally provided by the brake valve 30, can be increased as a result by way of the connection between the pressure reservoirs 9.1, 9.2 and the ABS brake valves 11, 12, 13, 14 being unblocked via the relay valves 25, 26. Therefore, a brake pressure $p_1$, $p_2$, $p_3$, $p_4$ can also be increased at the front or the rear wheel brakes 5, 6, 7, 8 via the ABS brake valves 11, 12, 13, 14 in order to achieve the demanded setpoint vehicle deceleration $z_{Soll}$.

According to an embodiment of the invention, a deceleration unit 15 is also provided, which, according to this embodiment, is part of the ABS control unit 10 and in which a method according to an embodiment of the invention for electronically controlling a vehicle deceleration of a brake slip-controlled vehicle 200 is carried out.

The deceleration unit 15 is designed for determining, preferably for estimating, the brake pressures $p_1$, $p_2$, $p_3$, $p_4$ presently output at the wheel brakes 5, 6, 7, 8, or—induced thereby—braking forces $K_1$, $K_2$, $K_3$, $K_4$ or braking torques $M_1$, $M_2$, $M_3$, $M_4$ of the wheels 1, 2, 3, 4, by way of an evaluation, for example, of the control times of the outlet valves and the inlet valves of the individual ABS brake valves 11, 12, 13, 14 with consideration for parameters, such as, for example, a brake cylinder size, stored, for example, in an EBS control unit 101 of the electronic brake system 100. The determined or estimated brake pressures $p_1$, $p_2$, $p_4$ or braking torques $M_1$, $M_2$, $M_4$ or braking forces $K_1$, $K_2$, $K_4$ are then adjusted by the deceleration unit 15 depending on a case of brake slip control carried out by the ABS, for example, at the left front wheel 3, by way of the output brake pressures $p_1$, $p_2$, $p_4$ being increased, for example, or reduced, wherein the output of the brake pressures $p_1$, $p_2$, $p_4$ takes place by way of a control of the 3/2 directional control valves 21, 22, the relay valves 25, 26, and the ABS brake valves 11, 12, 14 at the wheel brakes 5, 6, 8 of all non-brake slip-controlled and brakeable wheels 1, 2, 4 by means of the ABS control unit 10. The information confirming that a case of brake slip control by the ABS is present at one of the wheels 1, 2, 3, 4 can be provided, for example, by the ABS control unit 10 which outputs a corresponding signal to the deceleration unit 15 in the event that the setpoint brake slip $BS_{Soll}$ is exceeded, for example, at the left front wheel 3.

Figure 2A:
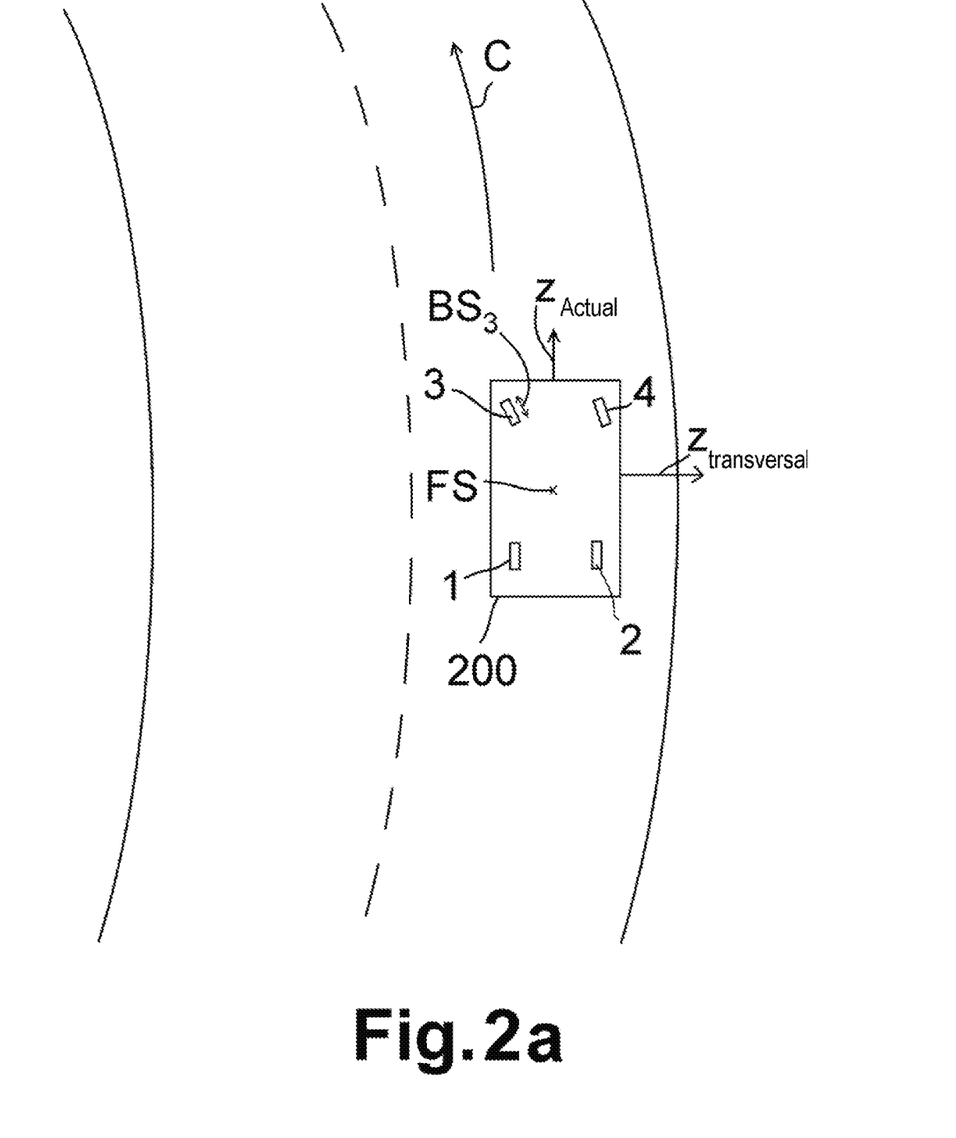
FIG. 2a shows the vehicle according to FIG. 1 during cornering.
Figure 2B:
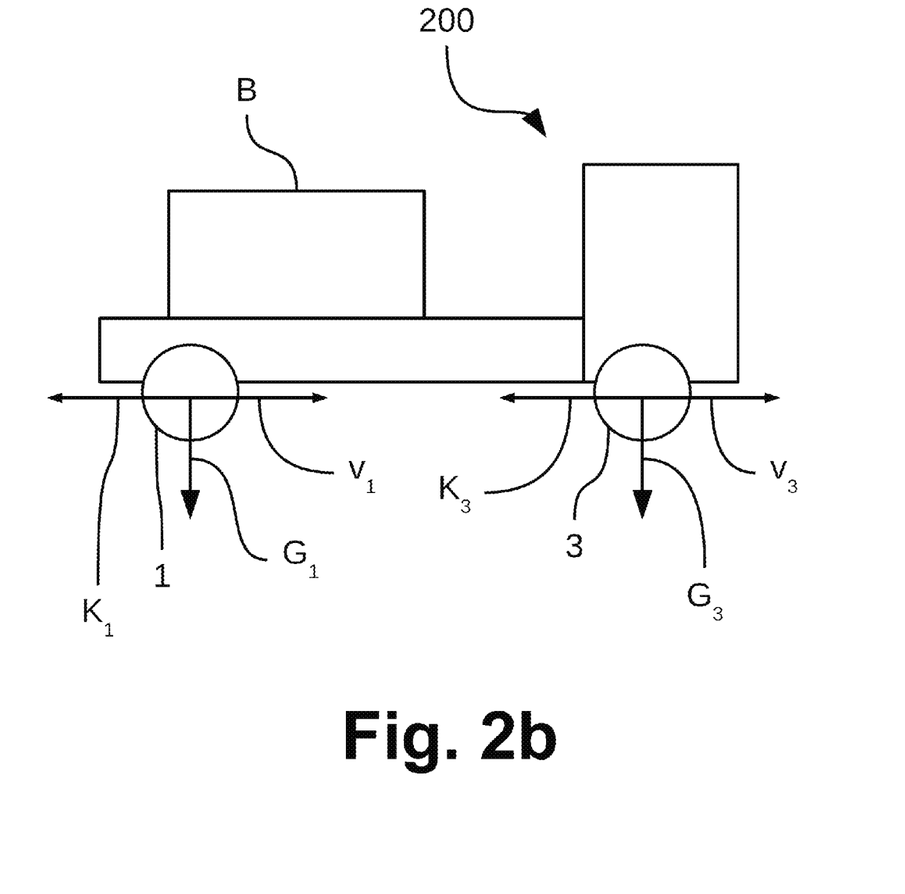
FIG. 2b shows a side view of the vehicle according to FIG. 1.

If a method according to an embodiment of the invention is carried out during cornering C and a driving situation according to FIG. 2a is assumed, i.e., the vehicle 200 is in a left-hand curve, monitoring is preferably additionally carried out to determine whether one of the inner wheels 1, 3 that was previously tending to lock up is brake slip-controlled by the ABS. If the inner left front wheel 3 is brake slip-controlled by the ABS, the deceleration unit 15 initiates, via the ABS control unit 10, an increase in the brake pressures $p_1$, $p_2$, $p_4$ at the wheel brakes 5, 6, 8 of the non-brake slip-controlled wheels 1, 2, 4 of the vehicle 200. If, according to FIG. 3, further brakeable wheels 301, 302, 303, 304 are present, for example, on a further axle or a trailer 300 or a semi-trailer, which are not brake slip-controlled at this point in time, the brake pressures can also be increased at these further wheels 301, 302, 303, 304.

Figure 3:
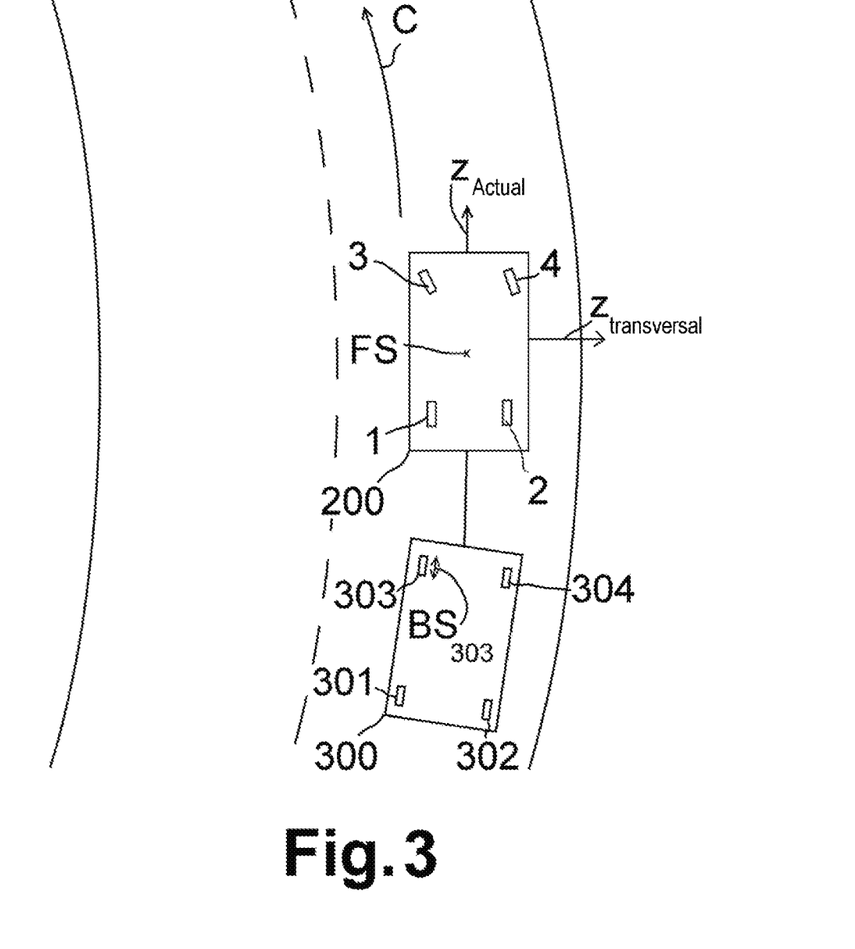
FIG. 3 shows a truck comprising a trailer during cornering.

An increase in or an adjustment of the brake pressures $p_1$, $p_2$, $p_4$ and, optionally, the brake pressures at the wheel brakes of the trailer 300 takes place with consideration for a factor F. In this case, it is provided that a total brake pressure $p_{Sum}$, which results from the sum of all brake pressures $p_1$, $p_2$, $p_3$, $p_4$ of the vehicle 200 and of the trailer 300, remains approximately the same with and without active ABS control, wherein the total brake pressure without active ABS control is calculated according to $p_{Sum}=p_1+p_2+p_3+p_4$, wherein the brake pressures $p_1$, $p_2$, $p_3$, $p_4$ without active ABS brake pressure control are estimated on the basis of the demanded setpoint vehicle deceleration $z_{Soll}$ with consideration for the parameters which relate to the brake cylinder size, in particular, and which are stored in the EBS control unit 101.

In the case of active ABS brake pressure control—at the left front wheel 3 in this example—the total brake pressure is calculated, with consideration for the factor F, according to $p^{ABS}_{Sum}=F\times(p_1+p_2+p_4)+p_3$, wherein a wheel-specific adjustment is also possible, i.e., each brake pressure $p_1$, $p_2$, $p_4$ is increased by a specific factor $F_1$, $F_2$, $F_4$, i.e., $p^{ABS}_{Sum}=F_1\times p_1+F_2\times p_2+F_4\times p_4+p_3$, wherein $p^{ABS}_{Sum}=p_{Sum}$ is required and $p_3$ is not affected in this example by the control according to an embodiment of the invention, but rather only by the ABS brake pressure control.

Alternatively, a total braking torque $M^{ABS}_{Sum}=F_1\times M_1+F_2\times M_2+F_4\times M_4+M_3$ or a total braking force $K^{ABS}_{Sum}=F_1\times K_1+F_2\times K_2+F_4\times K_4+K_3$ can also be taken into consideration in order to compensate for the missing braking effect. The total braking torque $M_{Sum}$ or the total braking force $K_{Sum}$ without active ABS brake slip control is correspondingly calculated according to $M_{Sum}=M_1+M_2+M_3+M_4$ or $K^{ABS}_{Sum}=K_1+K_2+K_3+K_4$, respectively, depending on the demanded setpoint vehicle deceleration $z_{Soll}$.

The factor F; $F_1$, $F_2$, $F_4$ depends, in particular, on how high the number of brake slip-controlled wheels 3 is and on how the brake force distribution in the vehicle 200 is set, for example by the EBS control unit 101. If each wheel brake 5, 6, 7, 8 without active ABS brake pressure control makes an approximately equal contribution to the effectuation of the setpoint vehicle deceleration $z_{Soll}$ and if only the left inner front wheel 3 is brake slip-controlled by the ABS, the missing braking effect or the resultant reduction in the total brake pressure $p_{Sum}$ is distributed to each of the brake pressures $p_1$, $p_2$, $p_4$ at the other wheel brakes 4, 6, 8 by approximately one-third. In this case, it is additionally taken into consideration that the left front wheel 3, which is brake slip-controlled by the ABS, continues to contribute to the deceleration of the vehicle 200, although to a lesser extent.

Therefore, in a case of ABS brake slip control at the left inner front wheel 3, in which the ABS control unit 10 implements a holding or a reduction of the brake pressure $p_3$, the setpoint vehicle deceleration $z_{Soll}$ is nevertheless achieved. The reason therefor is that, by holding or reducing the pressure at the wheel brake 7 of the left front wheel 3, which is brake slip-controlled by the ABS, said wheel makes a lesser contribution to effectuating the setpoint vehicle deceleration $z_{Soll}$ demanded, for example, by the RSC control unit 16. In order to nevertheless safely and reliably achieve the setpoint vehicle deceleration $z_{Soll}$, the brake pressures $p_1$, $p_2$, $p_4$ are correspondingly increased at the wheel brakes 5, 6, 8 of the other wheels 1, 2, 4 in order to compensate for the lower brake pressure $p_3$ at the wheel brake 7 of the left front wheel 3 which is brake slip-controlled by the ABS.

The same applies when, according to this embodiment, the inner left rear wheel 1 begins to slip and is brake slip-controlled by the ABS control unit 10. If both the inner left rear wheel 1 and the inner left front wheel 3 are brake slip-controlled by the ABS, the brake pressures $p_2$, $p_4$ of the wheel brakes 6 and 8 on the right side of the vehicle on the outside of the curve are correspondingly increased approximately two-fold, wherein the braking effect that is still ensured by way of the brake slip-controlled wheels 1 and 3 can also be taken into consideration here.

FIG. 3 shows a driving situation including a truck 200 and a trailer 300 comprising brakeable wheels 301, 302, 303, 304. If it is established that the brake slip $BS_{303}$ of the trailer wheel 303 is above the setpoint brake slip $BS_{Soll}$, the ABS control unit 10, for example, prompts the pressure at the wheel brakes of the trailer wheel 303 to be held or reduced. The brake pressure is adjusted accordingly at all other wheel brakes of the wheels 301, 302, 304 of the trailer 300 that are not brake slip-controlled by the ABS and at the wheel brakes 5, 6, 7, 8 of the wheels 1, 2, 3, 4 of the truck 200 that are not brake slip-controlled by the ABS. For the case as well in which the left front wheel 3 of the truck 200 is brake slip-controlled, all wheel brakes of the trailer 300 are taken into consideration in the adjustment of the brake pressures according to an embodiment of the invention, provided they have not already locked up.

The factor F or the wheel-specific factors $F_1$, $F_2$, $F_3$, $F_4$ can also be dynamically adjusted during braking in this case, e.g., in response to the stability of the vehicle 200 during braking in the event of the ABS brake slip control. In this way, the factors $F_2$, $F_4$ of the outer wheels 2, 4, which are not brake slip-controlled by the ABS, can be correspondingly increased and the factors $F_1$, $F_3$ of the inner wheels 1, which are not brake slip-controlled by the ABS, can be correspondingly reduced within the scope of the adjustment, for example also during a transition from straight-ahead travel into cornering C, which can be detected by way of the monitoring carried out by a steering wheel angle sensor 28, in order to relieve the inner wheels 1, which are tending to slip, in relation to the wheels 2, 4 of the outside of the curve, wherein the total brake pressure $p^{ABS}_{Sum}$ or the total braking torque $M^{ABS}_{Sum}$ or the total braking force $K^{ABS}_{Sum}$ remains the same. In addition, a different factor F; $F_1$, $F_2$, $F_3$, $F_4$ can also be established for the wheels 1, 2, 3, 4 of certain vehicle axles VA, HA depending on an axle load due to a load B of the vehicle 200 in order to take into consideration the different weights $G_1$, $G_2$, $G_3$, $G_4$ which are acting on the vehicle axles VA, HA and on the wheels 1, 2, 3, 4, respectively.

In addition, it can be provided to control the brake pressures $p_1$, $p_2$, $p_4$ at the wheel brakes 5, 6, 8 of the wheels 1, 2, 4, which are non-brake slip-controlled by the ABS, depending on the detected brake slip $BS_1$, $BS_2$, $BS_4$ and/or the transversal acceleration $z_{quer}$. In this case, monitoring is carried out to determine whether the brake slip $BS_1$, $BS_2$, $BS_4$ at one of the wheels 1, 2, 4, which is non-brake slip-controlled by the ABS, for example at the left rear wheel 1, is above a tolerance $BS_T$ for the brake slip, wherein the tolerance $BS_T$ is below the setpoint brake slip $BS_{Soll}$, i.e., there is no impermissible brake slip $BS_1$ at this wheel 1 yet; a precautionary tolerance $BS_T$ is therefore established. If this is reached, only the brake pressures $p_2$, $p_4$ at the wheel brakes 6, 8—at which the brake slip $BS_2$, $BS_4$ is below the tolerance $BS_T$—are adjusted or increased, and the brake pressure $p_1$ is held or increased to a lesser extent, for example, by way of the factors $F_1$, $F_2$, $F_4$ being correspondingly adjusted. As a result, it is possible to prevent a further case of ABS brake slip control from occurring at the non-brake slip-controlled wheel 1. The transversal acceleration $z_{quer}$ can be utilized in addition in order to evaluate the present driving situation.

In addition, lower factors F can also be established for a trailer 300 or a semi-trailer, since trailers 300 or semi-trailers have other stability characteristics, for example due to their design, such as a full trailer or a rigid drawbar trailer, or their weight, which can be determined by the EBS control unit.

Figure 4:
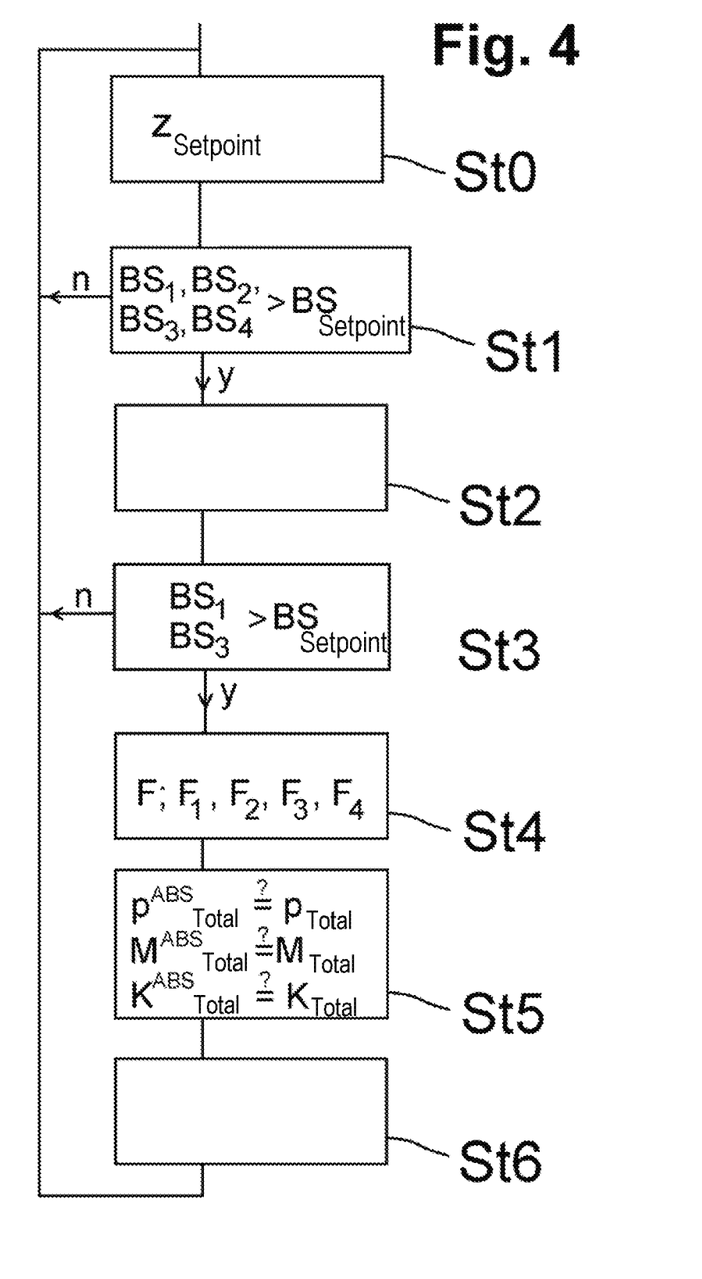
FIG. 4 shows a flow chart for carrying out a method according to an embodiment of the invention.

A method according to an embodiment of the invention can be carried out, according to FIG. 4, as follows. The method is started in a step St0, e.g., by way of a received braking demand of a driver assistance system such as, for example, a stability control system (roll stability control, RSC). In a first step St1, a detection is carried out to determine whether one of the wheels 1, 2, 3, 4 of the vehicle 200 has a brake slip $BS_1$, $BS_2$, $BS_3$, $BS_4$ that is greater than a setpoint brake slip $BS_{Soll}$, i.e., whether a case of ABS brake control which is actively controlled by the ABS control unit 10 is present at a wheel 1, 2, 3, 4. If a case of slip is not present, the procedure starts from the beginning.

Subsequently, in an optional second step St2, a detection is carried out to determine whether the vehicle 200 is cornering, for example by way of reading out a steering angle sensor 28 or a transversal acceleration sensor 17.

If cornering is taking place, a detection is carried out in an optional intermediate step St3 to determine whether the brake slip-controlled wheel 1, 2, 3, 4 determined in the step St1 is an inner wheel 1, 3. This can take place, for example, by way of a comparison of the brake slips $BS_1$ and $BS_2$ or $BS_3$ and $BS_4$ of the wheels 1, 2, 3, 4 of a vehicle axle VA, HA, since an inner wheel 1, 3 of a vehicle axle HA, VA has a greater tendency to slip than the outer wheel 2, 4 of the same vehicle axle HA, VA. Information from the transversal acceleration sensor 17, for example, or the steer angle can also be taken into consideration, however.

If a corresponding case of slip was detected in the step St1 or in the step St3, the brake pressures $p_1$, $p_2$, $p_3$, $p_4$ at the wheel brakes 5, 6, 7, 8 of all other non-brake slip-controlled wheels 1, 2, 3, 4 are determined in a fourth step St4, for example being estimated by the deceleration unit 15 and, in a fifth step St5, said brake pressures are increased by the ABS control unit 10 by way of a control of the corresponding valves 11, 12, 13, 14, 21, 22, wherein the presently output brake pressures $p_1$, $p_2$, $p_3$, $p_4$ at the non-brake slip-controlled wheel brakes 5, 6, 7, 8 are adjusted by the factor F or a wheel-specific factor $F_1$, $F_2$, $F_3$, $F_4$ according to the driving situation, and so the brake pressures $p_1$, $p_2$, $p_3$, $p_4$ output at the wheel brakes 5, 6, 7, 8, or the total brake pressure $p^{ABS}_{Sum}$ or the total braking torque $M^{ABS}_{Sum}$ or the total braking force $K^{ABS}_{Sum}$ compensate for the reduced braking effect of the slipping wheel. Therefore, the setpoint vehicle deceleration $z_{Soll}$ demanded by the RSC can be reached nevertheless. Without the optional steps St2 and St3, i.e., without taking cornering into consideration, the steps St2 and St3 are skipped and the method immediately jumps to step St4.

A dynamic adaptation of the factors F; $F_1$, $F_2$, $F_3$, $F_4$ can take place in an optional sixth step St6, wherein it is possible to take into account how the vehicle 200 responds to the increase of the brake pressures $p_1$, $p_2$, $p_3$, $p_4$ according to the invention. Once the method ends, the method starts again in the step St0.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS 1, 2 rear wheels
3, 4 front wheels
5, 6 rear wheel brakes
7, 8 front wheel brakes
9.1, 9.2, 9.3 pressure reservoir
10 ABS control unit
11, 12 ABS brake valves for rear wheel brakes 5, 6
13, 14 ABS brake valves for front wheel brakes 7, 8
15 deceleration unit
16 RSC control unit
17 transversal acceleration sensor
21, 22 3/2 directional control valve
23, 24 non-return valve
25, 26 relay valve
28 steering wheel angle sensor
30 brake valve
31 braking power sensor
100 brake system
101 EBS control unit
200 vehicle/truck
300 trailer
301, 302, 303, 304 wheel of trailer 300
ABS antilock braking system
B load
$BS_1$, $BS_2$, $BS_3$, $BS_4$ brake slip
$BS_{Soll}$ setpoint brake slip
C path/cornering
F factor
$F_1$, $F_2$, $F_3$, $F_4$ wheel-specific factor
FS vehicle center of gravity
$G_1$, $G_2$, $G_3$, $G_4$ weight
HA rear axle
$K_1$, $K_2$, $K_3$, $K_4$ braking force
$K_{Sum}$ total braking force without active ABS control
$K^{ABS}_{Sum}$ total braking force with active ABS control
$M_1$, $M_2$, $M_3$, $M_4$ braking torque
$M_{Sum}$ total braking torque without active ABS control
$M^{ABS}_{Sum}$ total braking torque with active ABS control
$p_1$, $p_2$, $p_3$, $p_4$ brake pressure for wheel brakes 5, 6, 7, 8
$p_{Sum}$ total brake pressure without active ABS control
$p^{ABS}_{Sum}$ total brake pressure with active ABS control
RSC roll stability control
$v_1$, $v_2$, $v_3$, $v_4$ wheel rotational speed
VA front axle
$z_{quer}$ transversal acceleration
$z_{Soll}$ setpoint vehicle deceleration
$z_{Ist}$ actual vehicle deceleration
St0, St1, St2, St3, St4, St5, St6 steps of the method

The invention claimed is:

1. A method for electronically controlling a vehicle deceleration of a brake slip-controlled vehicle comprising a pneumatic braking system, the method comprising:
   detecting that at least one wheel of the vehicle has a brake slip that exceeds a setpoint brake slip;
   in response to detecting that at least one of the wheels of the vehicle has a brake slip that exceeds the setpoint brake slip, brake slip-controlling the at least one wheel in order to prevent a lockup of the at least one wheel;
   determining a braking effect caused by wheel brakes on the wheels of the vehicle; and
   adjusting brake pressures output at the wheel brakes of one or more non-brake slip-controlled wheels in order to adjust the induced braking effect,
   wherein the brake pressures at the wheel brakes of all non-brake slip-controlled wheels are adjusted,
   wherein the brake pressures are selected in such a way that a braking effect reduced by the brake slip control at the at least one wheel is compensated for by the adjustment of the brake pressures on the wheel brakes of all non-brake slip-controlled wheels,
   wherein the brake pressures at the wheel brakes of the non-brake slip-controlled wheels are adjusted by a factor,
   wherein a wheel-specific factor is applied at each wheel brake of the non-brake slip-controlled wheels,
   wherein the factor is selected depending on whether cornering is present, and
   wherein the wheel-specific factors applied at each wheel brake of outer, non-brake slip-controlled wheels are higher than the wheel-specific factors applied at each wheel brake on inner, non-brake slip-controlled wheels.

2. The method as claimed in claim 1, wherein the braking effect is characterized by a brake pressure and/or a braking torque and/or a braking force.

3. The method as claimed in claim 1, wherein the brake pressure at the wheel brakes of the brake slip-controlled wheel is held or reduced by the brake slip control.

4. The method as claimed in claim 1, wherein the brake pressures at the wheel brakes of the non-brake slip-controlled wheels are selected in such a way that, for a detected setpoint vehicle deceleration, a total brake pressure or a total braking force or a total braking torque during active brake slip control approximately corresponds to a total brake pressure or a total braking force or a total braking torque without active brake slip control.

5. The method as claimed in claim 1, wherein the adjustment of the brake pressures at the wheel brakes of the non-brake slip-controlled wheels takes place when cornering is present.

6. The method as claimed in claim 1, wherein the factors are selected in such a way that the brake pressures at the wheel brakes of the non-brake slip-controlled wheels increase.

7. The method as claimed in claim 1, wherein the factor is dynamically adjusted during a braking depending on a response of the vehicle to the adjustment of the brake pressures at the wheel brakes of the non-brake slip-controlled wheels.

8. The method as claimed in claim 1, wherein the factor is selected depending on a transversal acceleration of the vehicle, and
wherein the wheel-specific factor applied at each wheel brake of the non-brake slip-controlled wheels, on which a weight acts that is higher due to the transversal acceleration, is set higher than the wheel-specific factors applied at each wheel brake of the non-brake slip-controlled wheels, on which a weight acts that is lower due to the transversal acceleration.

9. The method as claimed in claim 1, wherein the factor is selected depending on a load of the vehicle, and
wherein the wheel-specific factors applied at each wheel brake of the non-brake slip-controlled wheels, on which a weight acts that is higher due to the load, is set higher than the wheel-specific factors applied at each wheel brake of the non-brake slip-controlled wheels, on which a weight acts that is lower due to the load.

10. The method as claimed in claim 1, wherein it is determined whether cornering is present via a steering wheel angle sensor and/or a transversal acceleration sensor and/or on the basis of a comparison of the brake slips of the inner and the outer wheels of a vehicle axle.

11. The method as claimed in claim 1, wherein a roll stability control controlled by a RSC control unit is active during cornering in order to specify a setpoint vehicle deceleration for additional stabilization of the vehicle during cornering.

12. The method as claimed in claim 1, wherein, when cornering has been established, the brake pressures at the wheel brakes of the non-brake slip-controlled wheels are adjusted only if it is established that the brake slip-controlled wheel is not an outer wheel.

13. The method as claimed in claim 1, wherein the brake pressures at the wheel brakes of the non-brake slip-controlled wheels are additionally already adjusted, depending on the detected brake slip and/or the transversal acceleration, when a brake slip at one of the non-brake slip-controlled wheels is above a tolerance, wherein the brake pressures at the wheel brakes of the non-brake slip-controlled wheels are increased only at the wheel brakes at which the brake slip is below the tolerance in order to prevent a case of slip at a non-brake slip-controlled wheel as a precaution.

14. The method as claimed in claim 1, wherein the vehicle is a single-piece vehicle or a two-piece vehicle having a trailer or a semi-trailer, wherein the brake pressures and the brake slips at the wheel brakes or the wheels of the single-piece vehicle in the case of the single-piece vehicle and at the wheel brakes or the wheels of the semi-trailer or of the trailer in the case of a two-piece vehicle are adjusted and monitored.

15. A deceleration unit for electronically controlling a vehicle deceleration of a brake slip-controlled vehicle comprising a pneumatic brake system, wherein the deceleration unit is configured to:
detect that at least one of the wheels of the vehicle is brake slip-controlled,
determine the braking effect caused by the wheel brakes of the vehicle, and
adjust the brake pressures output at the wheel brakes of the non-brake slip-controlled wheels in order to adjust the induced braking effect,
wherein the deceleration unit is designed for adjusting the brake pressures at the wheel brakes of all non-brake slip-controlled wheels,
wherein a braking effect reduced by the brake slip control at the at least one wheel can be compensated for by way of the adjustment of the brake pressures at the wheel brakes of all non-brake slip-controlled wheels,
wherein the brake pressures at the wheel brakes of the non-brake slip-controlled wheels are adjusted by a factor,
wherein a wheel-specific factor is applied at each wheel brake of the non-brake slip-controlled wheels,
wherein the factor is selected depending on whether cornering is present, and
wherein the wheel-specific factors applied at each wheel brake of outer, non-brake slip-controlled wheels are higher than the wheel-specific factors applied at each wheel brake on inner, non-brake slip-controlled wheels.

16. A vehicle, comprising a device for carrying out a method as claimed in claim 1.

17. A method for electronically controlling a deceleration of a vehicle comprising a pneumatic braking system, the method comprising:
determining a setpoint vehicle deceleration;
outputting, at each respective wheel brake of a plurality of wheels of the vehicle, a respective brake pressure;
detecting that at least one wheel of the vehicle has a slip that exceeds a setpoint slip, and in response, brake slip-controlling each of one or more slipping wheels in order to prevent a lockup;
determining, for each of one or more respective non-brake slip-controlled wheels, a respective adjustment factor; and
adjusting, at each respective non-brake slip-controlled wheel based on the corresponding respective adjustment factor, the respective brake pressure output at the respective wheel brake to provide one or more respective adjusted brake pressures,
wherein a braking effect reduction caused by the brake slip-controlling each of the one or more slipping wheels is compensated for by a braking effect increase caused by the one or more respective adjusted brake pressures,
wherein the respective adjustment factor for each respective non-brake slip-controlled wheel is determined based on whether the respective non-brake slip-controlled wheel is an inner wheel or an outer wheel during cornering such that the one or more respective adjusted brake pressures provide increased braking pressure at outer wheels during cornering as compared with braking pressure at inner wheels during cornering.

18. The method as claimed in claim 17, further comprising detecting that a slip at a first non-brake slip-controlled wheels is above a tolerance,
wherein the respective adjusted brake pressure corresponding to the first non-brake slip-controlled wheel is not increased relative to the respective brake pressure output at the respective wheel brake corresponding to the first non-brake slip-controlled wheel.

19. The method as claimed in claim 17, wherein the setpoint vehicle deceleration is specified by a roll stability control (RSC) control unit during cornering.

20. The method as claimed in claim 17, wherein cornering is detected via a steering wheel angle sensor and/or a transversal acceleration sensor.

* * * * *